United States Patent
Cinar et al.

(10) Patent No.: US 10,906,393 B2
(45) Date of Patent: Feb. 2, 2021

(54) METHODS AND SYSTEMS FOR AN EXTERNAL FLAP OF A VEHICLE

(71) Applicant: Ford Global Technologies, LLC, Dearborn, MI (US)

(72) Inventors: Ahmet Cinar, Cologne (DE); James Weinfurther, Farmington, MI (US); Denney Vellaramkalayil, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 16/279,425

(22) Filed: Feb. 19, 2019

(65) Prior Publication Data

US 2019/0255940 A1    Aug. 22, 2019

(30) Foreign Application Priority Data

Feb. 21, 2018 (DE) .................. 10 2018 202 599

(51) Int. Cl.
*B60K 15/04* (2006.01)

(52) U.S. Cl.
CPC .. *B60K 15/0409* (2013.01); *B60K 2015/0416* (2013.01)

(58) Field of Classification Search
CPC ............ B60L 11/1818; B60K 15/0409; B60K 2015/0416; B60K 15/05; B60K 2015/0561; B60R 25/01
USPC ..................................................... 296/97.22
See application file for complete search history.

(56) References Cited

U.S. PATENT DOCUMENTS

| | | | |
|---|---|---|---|
| 5,544,508 A | 8/1996 | Torkowski | |
| 7,688,178 B2 * | 3/2010 | Koike | B60R 25/04 340/5.64 |
| 7,905,535 B2 | 3/2011 | Zentner et al. | |
| 8,627,860 B2 | 1/2014 | Ferguson et al. | |
| 8,710,949 B2 * | 4/2014 | Ledendecker | B60R 25/209 340/3.1 |
| 8,944,477 B2 * | 2/2015 | Proefke | B60L 53/16 292/144 |
| 9,080,354 B2 | 7/2015 | Krishnan | |
| 9,197,012 B2 * | 11/2015 | Nakajima | B60L 53/16 |
| 9,515,418 B2 * | 12/2016 | Yoshizawa | B60L 53/18 |
| 10,482,801 B2 * | 11/2019 | Mader | G09G 3/001 |
| 10,513,175 B2 * | 12/2019 | Schlaudraff | B60L 53/66 |
| 10,748,230 B2 * | 8/2020 | Mycroft | B67D 7/0401 |

(Continued)

FOREIGN PATENT DOCUMENTS

| | | | |
|---|---|---|---|
| DE | 102008016551 A1 | 6/2009 | |
| DE | 102012018489 A1 | 3/2014 | |
| EP | 0808980 A2 | 11/1997 | |

OTHER PUBLICATIONS

"V60-CrossCountry," Volvo Car Support, Available Online at http://support.volvocars.com/en-CA/cars/Pages/owners-manual.aspx?mc=v423&my=2016&sw=15w17&article=6fbd702ebaeac9b9c0a801e8019495be, "Available as Early as Jan. 2016", Retrieved Feb. 13, 2017, 3 pages.

*Primary Examiner* — Pinel E Romain
(74) *Attorney, Agent, or Firm* — Geoffrey Brumbaugh McCoy Russell LLP

(57) ABSTRACT

Methods and systems are provided for a refueling cap locking mechanism. In one example, a method includes unlocking the refueling cap in response to an engine start. The unlocking occurs without a vehicle operator input outside of a request to start the engine.

20 Claims, 3 Drawing Sheets

(56) References Cited

U.S. PATENT DOCUMENTS

| | | | |
|---|---|---|---|
| 2015/0048644 A1* | 2/2015 | Georgi | H03K 17/97 296/97.22 |
| 2015/0120151 A1* | 4/2015 | Akay | B60R 25/24 701/49 |
| 2017/0221116 A1* | 8/2017 | Makke | B67D 7/04 |
| 2019/0210468 A1* | 7/2019 | Wittl | H02J 7/0027 |

* cited by examiner

METHODS AND SYSTEMS FOR AN EXTERNAL FLAP OF A VEHICLE

CROSS REFERENCE TO RELATED APPLICATION

The present application claims priority to German Patent Application No. 102018202599.1, filed Feb. 21, 2018. The entire contents of the above-listed application are hereby incorporated by reference for all purposes.

FIELD

The present description relates generally to a locking mechanism for an exterior flap of a vehicle for replenishing energy storage of the vehicle.

BACKGROUND/SUMMARY

Vehicles may comprise an externally arranged cover and/or flap covering a port used to replenish a vehicle battery and/or to fill a vehicle fuel tank. The cover and/or flap may be shaped to block the port from weather conditions, as well as from strangers or other people a vehicle operator does not wish to gain access to the port.

In previous example, the cover and/or the flap is connected to a central vehicle locking mechanism. As such, to enable to a fuel attendant or other service worker to gain access to the port, the central vehicle locking mechanism is actuated resulting in the cover and/or flap moving from a locked position to an unlocked position. However, this has some drawbacks. In one example, the doors and trunk of the vehicle are also unlocked by actuating the central vehicle locking mechanism, which may unwantedly provide the fuel attendant or other service worker access to an interior of the vehicle.

One previous example is shown by Ferguson et al. in U.S. Pat. No. 8,627,860. Therein, a fuel delivery system comprises a fuel coupler which is designed to transfer fuel from a source to the vehicle, via the fuel port of the vehicle. The fuel coupler comprises a switch which, when toggled, transmits a control signal wirelessly over a short distance. After the control signal is received by a receiver which is integrated in the vehicle and which is located in the immediate vicinity of the fuel port, an unlocking actuator inside the vehicle unlocks the fuel tank flap, whereby the fuel tank cap may be moved into its open position for providing access to the fuel port.

Other examples include a button, separate from the central vehicle locking mechanism, that allows a vehicle operator to selectively unlock the external cover and/or the flap without unlocking the cabin doors.

However, the inventors have identified potential issues with such systems. For example, the cover and/or the flap still comprises a separate button for its locking and unlocking. Vehicle operators may commonly forget to press this button upon arriving at a refueling station, which may lead to reduced efficiency and increased wait times. Furthermore, the button may be arranged near a vehicle operator's feet, which may be difficult to access for some vehicle operators.

The inventors have come up with a way to at least partial solve the above-identified problems. In one example, the issues described above may be addressed by a method for unlocking a refueling cap in response to an engine start. In this way, a vehicle operator may not actuate an actuatable device to unlock the refueling cap, simplifying an interior vehicle layout.

In one example, the refueling cap is unlocked automatically without a vehicle operator input outside of an engine start request signaling the engine start. Once the engine is started, the refueling cap may be blocked from moving to the locked position. For example, if a vehicle door lock request is present to lock the vehicle doors while the engine is running (e.g., being fueled), then passenger doors and a luggage compartment door may be locked while the refueling cap may remain unlocked. The refueling cap may be locked in response to the engine being deactivated and the vehicle door lock request being present. By doing this, a lever, button, or other actuatable device dedicated for signaling only a locking request of the refueling cap may be omitted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
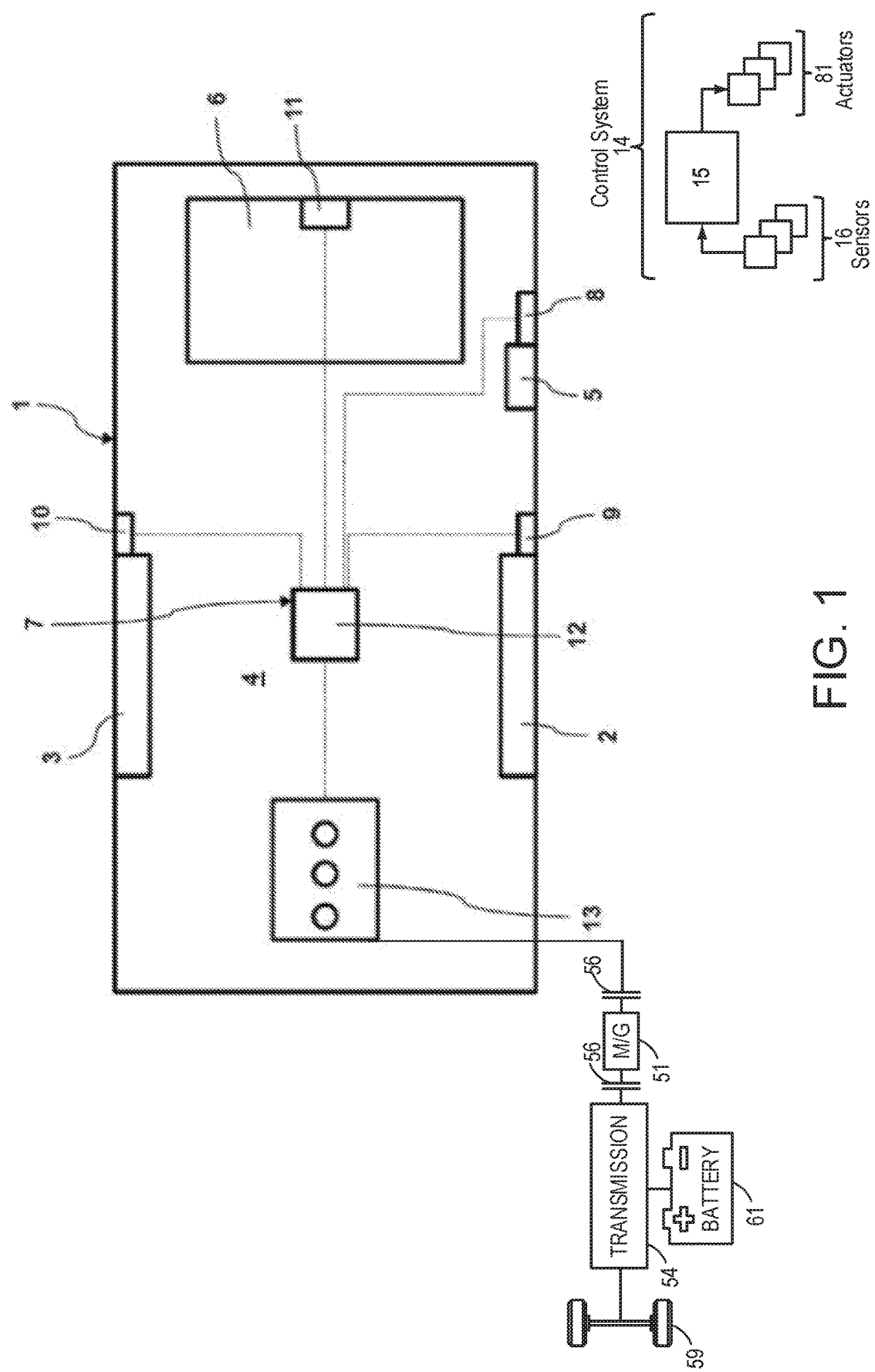
FIG. 1 shows a schematic view of an exemplary embodiment of a motor vehicle according to the invention.

The following description relates to methods and systems for a locking system for a vehicle, comprising at least one electrically actuatable refueling tank cap locking unit which via an electrical actuation is able to be transferred from a locked state, in which the refueling tank cap locking unit locks a refueling tank cap of the vehicle in a closed position, into a released state, in which the refueling tank cap locking unit releases the refueling tank cap, and vice versa, and at least one electronic actuating unit for the electrical actuation of the locking unit. The disclosure further relates to a vehicle comprising at least one door which in a closed state closes an entrance to a passenger compartment of the vehicle, at least one refueling tank cap which in a closed state covers a port of the hybrid vehicle, and at least one luggage compartment flap which in a closed state closes a luggage compartment of the vehicle. The disclosure further relates to a method for operating an electrical locking system of a vehicle.

A hybrid vehicle may be provided with a central locking system, various locking devices of the vehicle being able to be transferred simultaneously thereby from their respective locking states into their respective released states, and vice versa. In previous examples of central locking systems, a refueling tank cap locking device is also correspondingly actuated at the same time, a refueling tank cap being lockable thereby in its closed position in which the refueling tank cap covers a fuel filler neck or a charging port of the hybrid vehicle from the outside. The central locking system is activated via an actuating signal which is produced by a unit which is wirelessly connected to the vehicle, for example an electric vehicle key, or by a manually actuatable unit inside a passenger compartment of the motor vehicle. It is also known to produce automatically a corresponding actuating signal if the motor vehicle exceeds a specific minimum driving speed.

For example, it may be desired to disable separately the aforementioned locking of a fuel tank cap, which is in a closed position, if the vehicle is at a gas pump or a recharging station, whilst the remaining locking devices of the central locking system remain in their locked states. During such a refueling process a driver remains seated in the motor vehicle with the doors locked and a luggage compartment flap locked, whilst external personnel carry out the refueling process. In other previous examples, additionally or alternatively, an actuating unit, for example a lever, a knob or the like, which is installed in the passenger compartment, may be manually actuated, whereby the locking of the refueling tank cap, which is in its closed position, is separately disabled.

Another previous example includes DE 102008016551A1, which relates to a central locking system for a motor vehicle which comprises an electronic control device which receives signals produced outside a motor vehicle and signals produced inside the motor vehicle for locking and unlocking doors and/or flaps of the motor vehicle. The control device of the central locking system identifies the location of where an incoming locking signal has been generated and only locks a fuel tank flap if a locking signal produced outside the motor vehicle is transmitted to the control device.

Another previous example includes U.S. Pat. No. 7,905,535 B2, which relates to a fuel tank flap unit for a motor vehicle comprising a hinge arm which is configured for retaining a fuel tank flap and which is pivotably mounted about a pivot axis, a locking portion which is moved together with the fuel tank flap and a locking element which is movable by a control unit for locking and unlocking the fuel tank flap between a locked position in which the locking element engages in the locking portion and a released position in which the locking element does not engage in the locked position. The locking element comprises a beveled element surface which is arranged such that the locking portion comes into contact with the beveled element surface during a closing movement of the fuel tank flap in a state in which the locking element is in the locked position. Additionally or alternatively, the locking portion may have a beveled portion surface which is arranged such that this surface comes into contact with the locking element during a closing movement of the fuel tank flap in a state in which the locking element is in the locked position. The beveled surface is arranged and/or the beveled surfaces are arranged such that, during a closing movement of the fuel tank flap in a state in which the locking element is in the locked position, the locking element and the locking portion slide against one another.

Another previous example includes U.S. Pat. No. 9,080,354 B2, which relates to a motor vehicle comprising a fuel tank cap and a sliding door which are located on the same side of the motor vehicle. In its closed position the sliding door may be locked by a central locking system and a child lock system. In order to prevent the sliding door from obstructing the fuel tank cap during refueling, a locking control device reacts to a movement of the fuel tank cap into its open position, by retaining a current external locked or unlocked state and a current internal locked or unlocked state of the sliding door, by initiating or maintaining the external locked state and the internal locked state and, after the fuel tank cap has been moved into its closed position, restoring or maintaining the current external locked or unlocked state and the retained current internal locked or unlocked state.

Another previous example includes U.S. Pat. No. 5,544,508B2, which relates to a central locking system for locks on doors and flaps of a motor vehicle, which motor vehicle comprises a trunk flap and in the rear region a fuel tank filler neck flap. A single actuating drive of the central locking system is located with its drive in the rear region of the motor vehicle. Two mechanical force transmission systems are directly or indirectly connected to the actuating drive. The one force transmission system serves for locking the trunk flap. The other force transmission system serves for locking the fuel tank filler neck flap. The central locking system, for example on the driver's door of the motor vehicle, is able to be operated by means of a mechanical key and/or by means of an electronic key.

The object of the disclosure is to provide a locking system for a vehicle which is able to be produced more cost-effectively and is able to be handled in a simpler manner.

According to the disclosure, the fuel tank cap is automatically unlocked when the electrical actuating unit electronically determines and/or detects that the internal combustion engine of the motor vehicle has been started up. Other locking units of the motor vehicle, by which one respective door or tailgate of the motor vehicle is lockable/unlockable, are not influenced by the electrical actuation of the fuel tank cap locking unit, so that these locking units remain in their respective locked states. Even if the fuel tank cap has been locked via a central locking system before the internal combustion engine has been started up, this locking is automatically disabled by the actuating unit after the internal combustion engine has been started up, irrespective of the other locks. Since the actuating unit is also designed to maintain the released state of the fuel tank cap locking unit, which has been adopted after the internal combustion engine has been started up, the fuel tank cap is not locked when an actuating signal which is produced automatically, for example according to the driving speed or by manual actuation of a control element, is received by the actuating unit, after the internal combustion engine has been started up and/or during the operation of the internal combustion engine, for example during a journey of the motor vehicle.

During the journey, apart from the fuel tank cap locking unit, all remaining locking units may be in their respective locked states. If the driver of the motor vehicle drives toward a gas station, the fuel tank cap has already been unlocked whilst the doors and the luggage compartment flap are kept locked. Gas station personnel are able to move the unlocked fuel tank cap manually into its open position in which the fuel filler neck of the motor vehicle, which is arranged behind the fuel tank cap in its closed position, is accessible for carrying out a refueling process. Thus separate mechanical or electromechanical mechanisms are not used to unlock the fuel tank cap, by manual actuation of an actuating element in the passenger compartment of the motor vehicle. As a result, costs may be saved in comparison with previous examples of locking systems. Additionally, the handling of the locking system according to the disclosure is simplified relative to the previous examples of locking systems.

If the actuating unit determines that the internal combustion engine has been started up and if additionally no actuating signal is received by the actuating unit for transferring the locking units into their respective locked states, the fuel tank cap is not locked. If the actuating unit determines that the internal combustion engine has not been started up and if an actuating signal is received by the actuating unit for transferring the locking units into their respective locked states, the fuel tank cap is locked. If the actuating unit determines that the internal combustion engine has been started up and if, when the fuel tank cap is unlocked, an actuating signal is received by the actuating unit for transferring locking units into their respective locked states, the fuel tank cap is not locked.

The actuating unit may electronically determine from signals from at least one sensor device or by using an algorithm, to which at least one status parameter of the motor vehicle is supplied, whether the internal combustion engine of the motor vehicle has been started up or not. The actuating unit may be produced by software implemented in a vehicle electronics system which is already present or may be configured as a unit separate therefrom. The actuating unit may be connected to the fuel tank cap locking unit by a wired connection, for example via a bus system of the motor vehicle, or wirelessly, for example via a radio connection or the like.

The fuel tank cap locking unit may comprise at least one displaceable locking element which acts on the fuel tank cap in its closed position and at least one electrically activatable actuating mechanism for actuating the locking element.

According to an advantageous embodiment, the locking system comprises at least one door locking unit which via an electrical actuation is able to be transferred from a locked state, in which the door locking unit locks a door of the motor vehicle in a closed position, into a released state, in which the door locking unit releases the door, and vice versa, and at least one flap locking unit which via an electrical actuation is able to be transferred from a locked state, in which the flap locking unit locks a luggage compartment flap of the motor vehicle in a closed position, into a released state, in which the flap locking unit releases the luggage compartment flap, and vice versa, wherein the actuating unit is designed for receiving an actuating signal and, after receiving the actuating signal, for the simultaneous electrical actuation of the door locking unit and the flap locking unit. Accordingly, the actuating unit forms a part of a central locking system of the motor vehicle. Preferably, the locking system for each door and/or each luggage compartment flap comprises a separate door locking unit and/or flap locking unit. The actuating signal may be produced, for example, according to the speed, by the actuating signal being produced when the motor vehicle exceeds a predetermined minimum speed. Alternatively, the actuating signal may be produced by a manual actuation of an actuating knob or the like, which is arranged inside the passenger compartment of the motor vehicle.

According to a further advantageous embodiment, the actuating unit is configured to transfer the fuel tank cap locking unit into the locked state or to retain the fuel tank cap locking unit in this locked state when the internal combustion engine has not been started up and the actuating signal has been received by the actuating unit. As a result, all of the locking units of the locking system may be transferred simultaneously into their respective locked states, for example to be able to park the motor vehicle at a location in a fully locked position.

The advantages set forth above with reference to the locking system may be correspondingly associated with the hybrid vehicle. The hybrid vehicle may be a passenger motor vehicle or a utility vehicle. The door is arranged at the side on the motor vehicle. The motor vehicle may also have two or four corresponding doors, gaining a user access to a vehicle cabin. The refueling tank cap may be arranged at the side on the hybrid vehicle, external to the vehicle cabin. The luggage compartment flap may be arranged at the rear side or at the front side on the motor vehicle, gaining a user entry to an interior space of the vehicle, which may or may not be open to the vehicle cabin. It will be appreciated that the refueling tank cap may be a flap or pivotable cover used to shield a refueling port of the hybrid vehicle, wherein the refueling port may correspond to a fuel filler pipe or to a plug-in. As such, the refueling tank cap may cover the fuel filler pipe into which liquid or gaseous fuel is dispensed or the refueling tank cap may cover a recharging port into which a charging device is pressed to replenish a battery state of charge.

The above object is also achieved by the method comprising where it is determined electronically whether an internal combustion engine of the vehicle has been started up, wherein a fuel tank cap locking unit, which via an electrical actuation is able to be transferred from a locked state, in which the refueling tank cap locking unit locks a refueling tank cap of the vehicle in a closed position, into a released state, in which the refueling tank cap locking unit releases the refueling tank cap, and vice versa, is transferred into the released state or is retained in the released state when the internal combustion engine has been started up.

The advantages cited above with reference to the locking system are correspondingly associated with the method. In particular, the locking system according to one of the embodiments cited above or any combination of at least two of these embodiments with one another may be used for carrying out the method.

One advantageous embodiment provides that the fuel tank cap locking unit is transferred into the locked state or is retained in the locked state when the internal combustion engine has not been started up and an actuating signal has been received for the simultaneous electrical actuation of at least one door locking unit, by which a vehicle door of the motor vehicle is lockable in a closed position, and at least one flap locking unit, by which a luggage compartment flap of the motor vehicle is lockable in a closed position. The advantages cited above with reference to the corresponding embodiment of the locking system are accordingly associated with this embodiment.

"Starting up the internal combustion engine" also encompasses within the meaning of the disclosure the state where an ignition key is rotated into a pre-ignition position or an ignition button is depressed, wherein the internal combustion engine is not yet running, however. Thus it may be achieved that the internal combustion engine is not running during refueling. As such, starting the engine includes the engine being in an unfueled condition, where its pistons are not oscillating, to a fueled condition with its pistons oscillating. In this way, an engine start request may indicate a request to activate and/or start the engine so that a vehicle operator may drive the vehicle, wherein a condition prior to the engine start request blocked the vehicle operator from driving the vehicle.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a schematic view of an exemplary embodiment of a vehicle 1 according to the disclosure with two doors 2 and 3 which are arranged at the side on the vehicle 1 and which in each case in the closed state shown close an entrance, not shown, to a passenger compartment 4 of the motor vehicle 1. The passenger compartment 4 may correspond to an interior cabin of the vehicle 1, where a vehicle operator and other vehicle occupants may occupy.

Moreover, the vehicle 1 comprises a refueling tank cap 5 which is arranged at an external side on the motor vehicle 1 and which in the closed state shown covers a fuel filler neck, not shown, of the motor vehicle 1. As shown, the refueling tank cap 5 is arranged outside of the passenger compartment 4 on an exterior surface of the vehicle 1. The refueling tank cap 5 may cover a refueling port, wherein the refueling port may correspond to a fuel tank or to a battery of the vehicle. Thus, in one example, the refueling tank cap 5 covers the fuel filler neck and in another example, the refueling tank cap 5 covers a recharging port of the battery. In some examples, the refueling tank cap 5 may be one of at least two refueling tank caps of the vehicle 1, wherein a first refueling tank cap covers the fuel filler neck and a second refueling tank cap covers the recharging port. A single locking mechanism may be utilized for locking and unlocking of each of the first and second refueling tank caps.

Additionally, the vehicle 1 comprises a luggage compartment flap 6 which is arranged at the rear on the vehicle 1 and which in the closed state shown closes a luggage compartment, not shown, of the motor vehicle 1. The motor vehicle 1 also comprises a locking system 7. The luggage compartment may be an interior space of the vehicle, separate from the refueling tank cap 5. In some examples, the luggage compartment may extend from the interior cabin such that the two are a single, continuous space. Additionally or alternatively, the luggage compartment may be a space separate from the interior cabin such that the luggage compartment is accessible only when the luggage compartment flap 6 is in an open position.

The locking system 7 has an electrically actuatable fuel tank cap locking unit 8 which via an electrical actuation is able to be transferred from a locked state, in which the fuel tank cap locking unit 8 locks the fuel tank cap 5 in the closed position, into a released state, in which the fuel tank cap locking unit 8 releases the fuel tank cap 5, and vice versa. Additionally, the locking system 7 for each door 2 and/or 3 comprises a door locking unit 9 and/or 10 which via an electrical actuation is able to be transferred from a locked state, in which the respective door locking unit 9 and/or 10 locks the respective door 2 and/or 3 in the closed position, into a released state, in which the respective door locking unit 9 and/or 10 releases the respective door 2 and/or 3, and vice versa. Moreover, the locking system 7 comprises a flap locking unit 11 which via an electrical actuation is able to be transferred from a locked state in which the flap locking unit 11 locks the luggage compartment flap 6 in the closed position, into a released state in which the flap locking unit 11 releases the luggage compartment flap 6, and vice versa.

Moreover, the locking system 7 comprises an electronic actuating unit 12 for the electrical actuation of the refueling tank cap locking unit 8, the door locking units 9 and 10 and the flap locking unit 11. The actuating unit 12 is designed to determine electronically whether an internal combustion engine 13 of the vehicle 1 has been started up and to transfer the fuel tank cap locking unit 8 into the released state or to retain the fuel tank cap locking unit in the released state when the internal combustion engine 13 has been started up. Additionally, the actuating unit 12 is designed for receiving an actuating signal and, after receiving the actuating signal, for the simultaneous electrical actuation of the door locking units 9 and 10 and the flap locking unit 11. Moreover, the actuating unit 12 is designed to transfer the fuel tank cap locking unit 8 into the locked state or to retain the fuel tank cap locking unit in the locked state if the internal combustion engine 13 has not been started up and the actuating signal has been received by the actuating unit 12.

Vehicle 1 may further include control system 14. Control system 14 is shown receiving information from a plurality of sensors 16 and sending control signals to a plurality of actuators 81. As one example, sensors 16 may include electronic receivers configured to receive signals from the locking system 7. 6. As another example, the actuators may include the electronic actuating unit 12 and each of the refueling tank cap locking unit 8, door locking units 9 and 10, and flap locking unit 11.

Controller 15 may be configured as a conventional microcomputer including a microprocessor unit, input/output ports, read-only memory, random access memory, keep alive memory, a controller area network (CAN) bus, etc. Controller 15 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, vehicle 1 is a hybrid vehicle comprising multiple sources of torque available to one or more vehicle wheels 59. In other examples, vehicle 1 is a conventional vehicle with only an engine, or an electric vehicle with only electric machine(s). In the example shown, vehicle 1 includes engine 13 and an electric machine 51. Electric machine 51 may be a motor or a motor/generator. A crankshaft of engine 13 and electric machine 51 may be connected via a transmission 54 to vehicle wheels 59 when one or more clutches 56 are engaged. In the depicted example, a first clutch 56 is provided between crankshaft 40 and electric machine 51, and a second clutch 56 is provided between electric machine 51 and transmission 54. Controller 15 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

Figure 2:
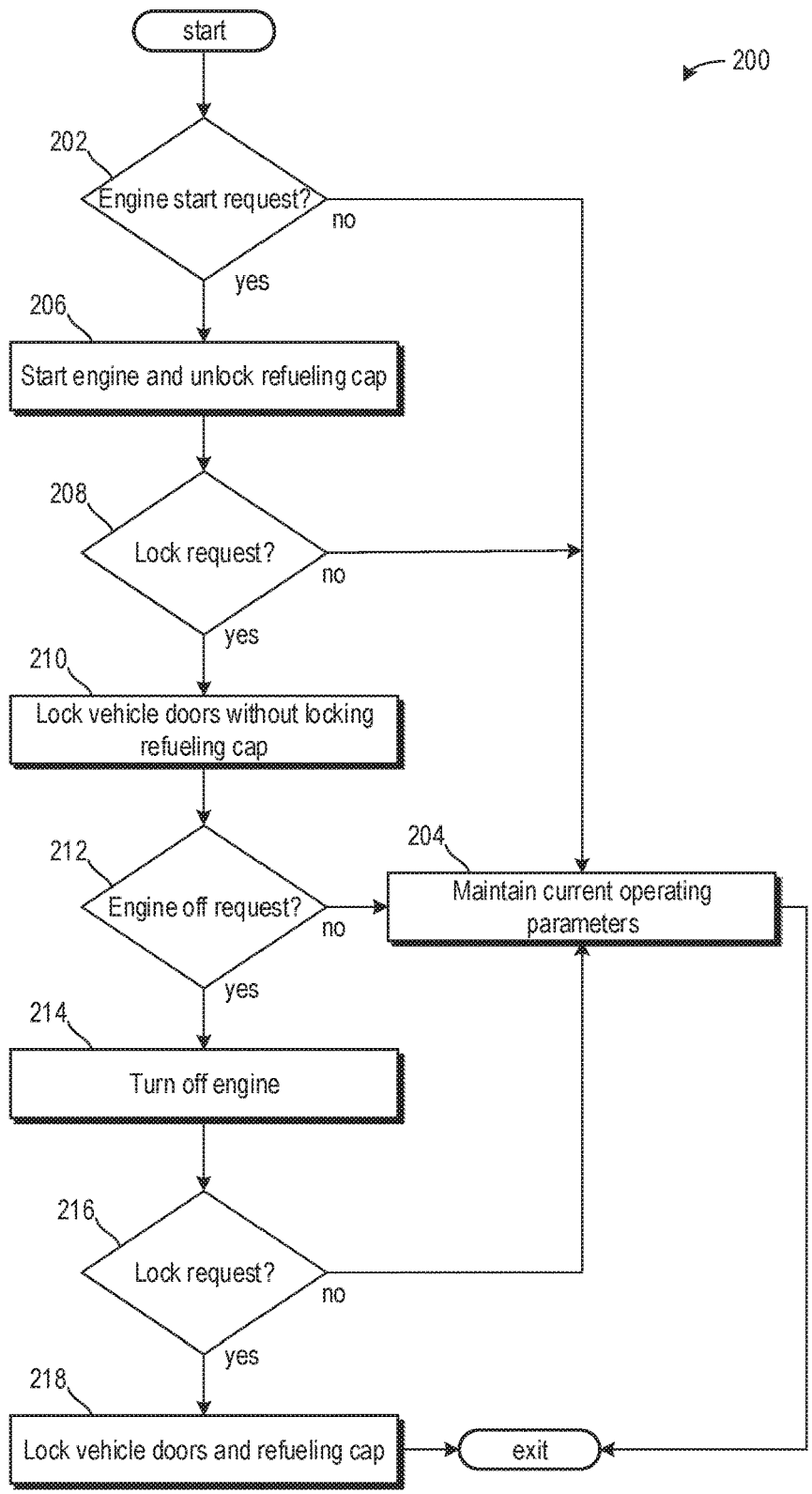
FIG. 2 shows a method for operating the external flap covering a refueling port of the motor vehicle.

Turning now to FIG. 2, it shows a method 200 for locking and unlocking a refueling cap. Instructions for carrying out method may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 200 begins at 202, which includes determining if an engine start request is present. In one example, the engine start request is prompted by a vehicle operator via turning an ignition key or depressing a button. The button may be an ignition button arranged within the vehicle or may be a button arranged outside of the vehicle (e.g., a remote start).

If the vehicle operator did not request an engine start, then the method 200 proceeds to 204 to maintain current operating parameters. In one example, this may include the engine being off and the refueling cap being kept in its current position, which may be locked or unlocked, as will be described in greater detail herein. Additionally or alternatively, the engine may already be running, in which case maintain current operating parameters may include leaving the refueling cap in an unlocked position. As another example, if an engine includes a start/stop feature, starting the engine following a stop (e.g., a deactivation of the engine) may not correspond to an engine start request. In this way, a refueling cap may remain unlocked through the start/stop feature.

If the engine start request is present, then the method 200 proceeds to 206, which includes starting the engine and unlocking the refueling cap. Starting the engine may include fueling the engine. Unlocking the refueling cap may include signaling to an actuator of the refueling cap to actuate a locking element of the refueling cap so that the refueling cap may be opened from an exterior of the vehicle. In one example, a controller (e.g., controller 15 of FIG. 1) signals to a refueling tank cap locking unit (e.g., refueling tank cap locking unit 8 of FIG. 1) to unlock a refueling tank cap (e.g., refueling tank cap 5 of FIG. 1) in response to the engine starting. In this way, the refueling cap is unlocked automatically in response to the engine starting without a vehicle operator input outside of the engine start request. In one example, the unlocking may include unlatching or other unlocking motion of the refueling cap.

Additionally or alternatively, the engine start request may be a motor start request, wherein the motor is either an engine or an electric motor. As such, if a vehicle operator initiates a motor start request for a hybrid vehicle, and the hybrid vehicle initiates operation in an all-electric mode by activating the electric motor while the engine remains off, the refueling cap may be unlocked. As such, and as described above, the vehicle (e.g., the hybrid vehicle) may comprise more than one refueling cap, wherein at least one refueling cap covers a fuel filler neck and another refueling cap covers a recharging port.

The method 200 proceeds to 208, which includes determining if there is a lock request. The lock request may be initiated by a vehicle operator or by the vehicle. In one example, the vehicle may initiate a lock request during a subsequent motion of the vehicle following the engine start. Additionally or alternatively, the vehicle operator may initiate the lock request via a lock button arranged within the vehicle, on a key, or via actuating a key within a slot. If a lock request is not present, then the method 200 proceeds to 204 to maintain current operating parameters. As such, a position of the locks of the cabin doors and/or passenger doors, luggage compartment flap are unchanged.

If the lock request is present, then the method 200 proceeds to 210 to lock the vehicle doors, including the cabin doors and the luggage compartment flap without locking the refueling cap. As such, the refueling cap remains unlocked following the engine start even in the presence of a vehicle operator vehicle door lock request. In one example, the vehicle door lock request is executed via a first locking mechanism while the engine is running, wherein the first locking mechanism may lock or unlock only the cabin doors and the luggage compartment flap and not the refueling cap.

In one example, the cabin doors and the luggage compartment flap locks are actuated (e.g., locked and unlocked) only via the first locking mechanism. As such, the refueling cap is unlocked at 206 via a second locking mechanism different than the first, wherein the second locking mechanism is configured to unlock only the refueling cap when the engine is started. In one example, each of the first locking mechanism and the second locking mechanism are electronic locking mechanisms.

The method 200 proceeds to 212, which includes determining if an engine off request is present. The engine off request may be initiated by the vehicle operator and may include turning an ignition key or depressing a button. In one example, the engine off request is signaled in a manner similar to the engine on request.

If the engine off request is not present, then the method 200 proceeds to 204, to maintain current operating parameters. If the engine off request is present, then the method 200 proceeds to 214 to turn off the engine. This may include stopping fuel injections to the engine.

The method 200 proceeds to 216, which includes determining if a lock request is present. The lock request may be similar to the lock request described above at 208. If the lock request is not present, then the method 200 proceeds to 204 to maintain current operating parameters and does not adjust a position of the locks of the various vehicle locks.

If the lock request is present, then the method 200 proceeds to 218, which includes locking the vehicle doors, including the doors to the vehicle cabin and the flap to the luggage compartment, and locking the refueling cap. As such, when the engine is off and the vehicle operator requests a vehicle lock, a refueling cap lock position may be actuated with the doors and flap. As such, a user may not open the refueling cap, the doors, or the flap without a key or other suitable device while their corresponding locks are in the locking position.

Figure 3:
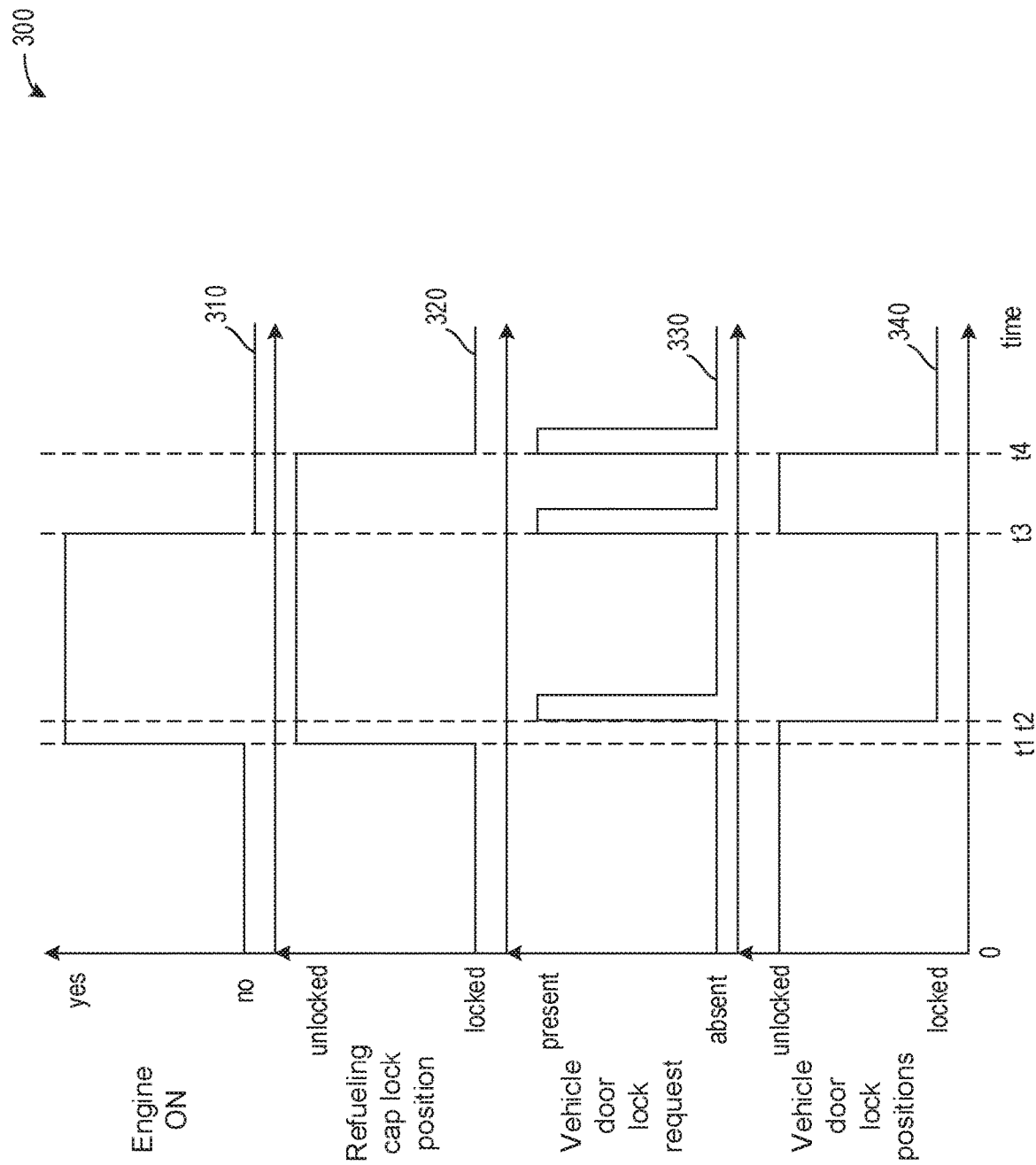
FIG. 3 shows a prophetic engine operating sequence with regard to the external flap.

Turning now to FIG. 3, it shows a prophetic engine operating sequence 300 graphically illustrating lock positions of the refueling cap and the vehicle doors. Plot 310 illustrates if an engine is on. An engine is on if it is being fueled and its pistons are oscillating. Plot 320 illustrates a position of the refueling cap lock. Plot 330 illustrates if a vehicle door lock request is present. Plot 340 illustrates if a position of the vehicle door locks. The vehicle door locks may include a lock for doors for entering the interior cabin and a lock for a flap for entering a luggage compartment. In one example, the doors for entering the interior cabin may herein be referred to as passenger doors. Time increases from a left to right side of the figure.

Prior to t1, the engine is off (plot 310). The refueling cap lock position is in a locked position (plot 320). The vehicle door lock request is absent (plot 330). The vehicle door lock positions are in an unlocked position (plot 340). As such, a user outside of the vehicle may access the interior vehicle cabin via the passenger doors and the luggage compartment via the flap. Furthermore, a fuel tank may not be refueled and a battery may not be recharged due to the refueling cap being locked. At t1, an engine start is requested and the engine is turned on. The refueling cap lock position is simultaneously and automatically switched from the locked position to the unlocked position in response to the engine start request initiated by a vehicle operator.

In one example, a motor start may be requested at t1, the motor start request corresponding to a request to start an internal combustion engine, an electric motor, or both. In response to the motor start request and activation of one or more of the internal combustion engine and the electric motor, the refueling cap is unlocked.

Between t1 and t2, the vehicle door lock positions remain unlocked and the refueling cap lock position remains unlocked. In one example, between t1 and t2, the vehicle operator may be loading items into the vehicle. At any rate, the vehicle may be stationary between t1 and t2. At t2, the vehicle may begin to move, which may result in a vehicle door lock request. Additionally or alternatively, a vehicle operator may initiate the vehicle door lock request. At any rate, the vehicle door lock positions are moved to the locked position while the refueling cap lock position remains in the unlocked position, thereby ignoring the request.

Between t2 and t3, the vehicle door lock request is absent. The vehicle door lock positions are in the locked position and the refueling cap lock position is in the unlocked position. In one example, the vehicle is driven between t2 and t3. It will be appreciated that the refueling cap may not be ajar while in the unlocked position. However, a user outside of the vehicle may press against the refueling cap to signal a desire to open the refueling cap without vehicle operator input.

At t3, an engine off request is present and the engine is switched to an off position. The refueling cap lock position remains in the unlocked position. A vehicle door lock request is present to unlock the vehicle doors. As such, the vehicle door lock positions are moved to the unlocked position. Between t3 and t4, the vehicle door locks and the refueling cap lock remain in the unlocked position. At t4, a vehicle door lock request is present to lock the vehicle doors. As such, the vehicle doors, including the locks corresponding to the passenger doors and the flap to the luggage compartment are locked. Additionally, the refueling cap lock position is simultaneously switched to the locked position in response to the vehicle door lock request. After t4, the engine remains off and the refueling cap lock and the vehicle door locks are in the locked positions. In one example, if a remote engine start is request after t4, the engine may be started and the refueling cap lock position may be switched to the unlocked position without adjusting the locked position of the vehicle door locks.

In this way, a refueling cap lock may be actuated without a lever or other device needing a vehicle operator input while a motor is running, such as an engine or an electric motor. The technical effect of automatically unlocking the refueling cap in response to an engine start is to allow one or more vehicle occupants to remain in a vehicle during a refueling event without unlocking the doors. Furthermore, the refueling cap is locked in response to the engine being off and the vehicle operator requesting a vehicle door lock. This may block unwanted people from gaining access to the vehicle interior and the fuel filler neck and/or recharge port.

In another representation, a locking system for a vehicle, comprises at least one electrically actuatable fuel tank cap locking unit which via an electrical actuation is able to be transferred from a locked state, in which the fuel tank cap locking unit locks a fuel tank cap of the motor vehicle in a closed position, into a released state in which the fuel tank cap locking unit releases the fuel tank cap, and vice versa, and at least one electronic actuating unit for the electrical actuation of the fuel tank cap locking unit, characterized in that the actuating unit is configured to determine electronically whether an internal combustion engine of the vehicle has been started up and to transfer the fuel tank cap locking unit into the released state or to retain said fuel tank cap locking unit in the released state when the internal combustion engine has been started up.

A first example of the locking system comprises at least one door locking unit which via an electrical actuation is able to be transferred from a locked state, in which the door locking unit locks a door of the vehicle in a closed position, into a released state, in which the door locking unit releases the door, and vice versa, and at least one flap locking unit which via an electrical actuation is able to be transferred from a locked state, in which the flap locking unit locks a luggage compartment flap of the vehicle in a closed position, into a released state, in which the flap locking unit releases the luggage compartment flap and vice versa, wherein the actuating unit is designed for receiving an actuating signal and, after receiving the actuating signal, for the simultaneous electrical actuation of the door locking unit and the flap locking unit.

A second example of the locking system optionally includes where the actuating unit is designed to transfer the fuel tank cap locking unit into the locked state or to retain the fuel tank cap locking unit in this locked state when the internal combustion engine has not been started up and the actuating signal has been received by the actuating unit.

A third example, optionally including any of the previous example, further includes where at least one door which in a closed state closes an entrance to a passenger compartment of the vehicle, at least one fuel tank cap which in a closed state covers a fuel filler neck of the motor vehicle, and at least one luggage compartment flap which in a closed state closes a luggage compartment of the motor vehicle.

A method including any of the above examples further includes where operating an electrical locking system of a vehicle, wherein it is determined electronically whether an internal combustion engine of the vehicle has been started up, and a fuel tank cap locking unit, which via an electrical actuation is able to be transferred from a locked state, in which the fuel tank cap locking unit locks a fuel tank cap of the vehicle in a closed position, into a released state, in which the fuel tank cap locking unit releases the fuel tank cap, and vice versa, is transferred into the released state or is retained in the released state when the internal combustion engine has been started up.

The method, optionally including any of the above examples, further includes where the fuel tank cap locking unit is transferred into the locked state or is retained in the locked state when the internal combustion engine has not been started up and an actuating signal has been received for the simultaneous electrical actuation of at least one door locking unit, by which a door of the vehicle is lockable in a closed position, and at least one flap locking unit, by which a luggage compartment flap of the vehicle is lockable in a closed position.

An embodiment of a method comprises unlocking a refueling cap in response to an engine start. Additionally or alternatively, the method comprises unlocking the refueling cap in response to a vehicle operator request to start an engine. A first example of the method, optionally including where the unlocking occurs automatically without a vehicle operator input outside of an engine start request signaling the engine start. A second example of the method, optionally including the first example, further includes where maintaining the refueling cap in an unlocked position in response to a vehicle door lock request while an engine is running. A third example of the method, optionally including the first and/or second examples, further includes where switching the refueling cap to a locked position in response to the vehicle door lock request while the engine is off. A fourth example of the method, optionally including one or more of the first through third examples, further includes where the vehicle door lock request further comprises locking at least one passenger door and at least one luggage compartment door.

An embodiment of a system comprises a vehicle comprising at least one passenger door, at least one luggage compartment door, and at least one refueling cap arranged on an exterior of the vehicle and a controller with computer-readable instructions stored on non-transitory memory thereof that when executed enable the controller to start an engine in response to an engine start request initiated by a vehicle operator and simultaneously unlock the at least one refueling cap. A first example of the system further includes where the vehicle operator does not request to unlock the at least one refueling cap. A second example of the system, optionally including the first example, further includes where the vehicle is free of levers or buttons within a vehicle interior for unlocking the at least one refueling cap. A third example of the system, optionally including the first and/or second examples, further includes where the at least one refueling cap covers a fuel filler neck, wherein the at least one refueling cap comprises a locked position blocking access to the fuel filler neck, further comprising an unlocked position allowing access to the fuel filler neck. A fourth example of the system, optionally including one or more of the first through third examples, further includes where the vehicle is a hybrid vehicle comprising a battery, and where the at least one refueling cap covers a recharging port of the hybrid vehicle. A fifth example of the system, optionally including one or more of the first through fourth examples, further includes where the instructions further enable the controller to lock the at least one passenger door and the at least one luggage compartment door in response to a vehicle door lock request, wherein the at least one refueling cap remains unlocked in response to the vehicle door lock request while the engine is running. A sixth example of the system, optionally including one or more of the first through fifth examples, further includes where the instructions further enable the controller to lock the at least one passenger door, the at least one luggage compartment door, and the at least one refueling cap in response to a vehicle door lock request when the engine is off. A seventh example of the system, optionally including one or more of the first through sixth examples, further includes where the at least one passenger door and the at least one luggage compartment door are locked and unlocked by a first locking mechanism, and where the refueling cap is locked via the first locking mechanism when the engine is off, and where the refueling cap is unlocked via a second locking mechanism when the engine is started. An eighth example of the system, optionally including one or more of the first through seventh examples, further includes where the second locking mechanism does not adjust the at least one passenger door and the at least one luggage compartment door between locked and unlocked positions. A ninth example of the system, optionally including one or more of the first through eighth examples, further includes where the at least one passenger door is shaped to provide access to a vehicle cabin, wherein the at least one luggage compartment door is shaped to provide access to a luggage compartment.

An embodiment of a vehicle comprises a first locking mechanism configured to lock each of a passenger door, a luggage compartment door, and a refueling cap in response to a vehicle lock request when a motor is off and a second locking mechanism configured to unlock only the refueling cap in response to the motor being started. A first example of the vehicle further comprises where the vehicle is a hybrid vehicle, and where the motor is a first motor equal to an internal combustion engine, further comprising a second motor equal to an electric motor, and where the second locking mechanism unlocks the refueling cap in response to the internal combustion engine or the electric motor being activated. A second example of the vehicle, optionally comprising the first example, further comprises where the first locking mechanism is configured to lock or unlock only the passenger door and the luggage compartment door and not the refueling cap when the motor is running. A third example of the vehicle, optionally including the first and/or second examples, further includes where vehicle is free of an actuator actuatable to unlock or lock the refueling cap when the motor is running. A fourth example of the vehicle, optionally including one or more of the first through third examples, further includes where the motor is started in response to a motor start request, and where the refueling cap is unlocked simultaneously with the motor being started.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

In another representation, a method includes unlocking a refueling cap in response to a vehicle operator requesting an engine start.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   unlocking a refueling cap in response to an engine start or an operator requesting an engine start.

2. The method of claim 1, wherein the unlocking occurs automatically without a vehicle operator input outside of an engine start request requesting the engine start.

3. The method of claim 1, further comprising maintaining the refueling cap in an unlocked position in response to a vehicle door lock request while an engine is running.

4. The method of claim 3, further comprising switching the refueling cap to a locked position in response to the vehicle door lock request while the engine is off.

5. The method of claim 4, wherein the vehicle door lock request further comprises locking at least one passenger door and at least one luggage compartment door.

6. A system comprising:
   a vehicle comprising at least one passenger door, at least one luggage compartment door, and at least one refueling cap arranged on an exterior of the vehicle; and
   a controller with computer-readable instructions stored on non-transitory memory thereof that when executed enable the controller to:
   start an engine in response to an engine start request initiated by a vehicle operator; and
   simultaneously unlock the at least one refueling cap.

7. The system of claim 6, wherein the vehicle operator does not request to unlock the at least one refueling cap.

8. The system of claim 6, wherein the vehicle is free of levers or buttons within a vehicle interior for unlocking the at least one refueling cap.

9. The system of claim 6, wherein the at least one refueling cap covers a fuel filler neck, wherein the at least one refueling cap comprises a locked position blocking access to the fuel filler neck, further comprising an unlocked position allowing access to the fuel filler neck.

10. The system of claim 6, wherein the vehicle is a hybrid vehicle comprising a battery, and where the at least one refueling cap covers a recharging port of the hybrid vehicle.

11. The system of claim 6, wherein the instructions further enable the controller to lock the at least one passenger door and the at least one luggage compartment door in response to a vehicle door lock request, wherein the at least one refueling cap remains unlocked in response to the vehicle door lock request while the engine is running.

12. The system of claim 6, wherein the instructions further enable the controller to lock the at least one passenger door, the at least one luggage compartment door, and the at least one refueling cap in response to a vehicle door lock request when the engine is off.

13. The system of claim 6, wherein the at least one passenger door and the at least one luggage compartment door are locked and unlocked by a first locking mechanism, and where the refueling cap is locked via the first locking mechanism when the engine is off, and where the refueling cap is unlocked via a second locking mechanism when the engine is started.

14. The system of claim 13, wherein the second locking mechanism does not adjust the at least one passenger door and the at least one luggage compartment door between locked and unlocked positions.

15. The system of claim 6, wherein the at least one passenger door is shaped to provide access to a vehicle cabin, wherein the at least one luggage compartment door is shaped to provide access to a luggage compartment.

16. A vehicle comprising:
    a first locking mechanism configured to lock each of a passenger door, a luggage compartment door, and a refueling cap in response to a vehicle lock request when a motor is off; and
    a second locking mechanism configured to unlock only the refueling cap in response to the motor being started.

17. The vehicle of claim 16, wherein the vehicle is a hybrid vehicle, and where the motor is a first motor equal to an internal combustion engine, further comprising a second motor equal to an electric motor, and where the second locking mechanism unlocks the refueling cap in response to the internal combustion engine or the electric motor being activated.

18. The vehicle of claim 16, wherein the first locking mechanism is configured to lock or unlock only the passenger door and the luggage compartment door and not the refueling cap when the motor is running.

19. The vehicle of claim 16, the vehicle is free of an actuator actuatable to unlock or lock the refueling cap when the motor is running.

20. The vehicle of claim 16, wherein the motor is started in response to a motor start request, and where the refueling cap is unlocked simultaneously with the motor being started.

* * * * *